United States Patent [19]

Arnold

[11] Patent Number: 4,581,746
[45] Date of Patent: Apr. 8, 1986

[54] TECHNIQUE FOR INSERTION OF DIGITAL DATA BURSTS INTO AN ADAPTIVELY ENCODED INFORMATION BIT STREAM

[75] Inventor: Hamilton W. Arnold, Holmdel, N.J.

[73] Assignee: AT&T Bell Laboratories, Murray Hill, N.J.

[21] Appl. No.: 565,762

[22] Filed: Dec. 27, 1983

[51] Int. Cl.⁴ .................. H04J 3/12; H04M 11/06
[52] U.S. Cl. ........................... 375/5; 375/31; 370/110.1; 370/111; 179/2 DP
[58] Field of Search ............... 370/7, 110.1, 111, 80; 375/5, 30, 31; 179/2 DP; 358/15, 135; 332/11 D

[56] References Cited

U.S. PATENT DOCUMENTS

| | | | |
|---|---|---|---|
| 3,420,956 | 1/1969 | Heightley et al. | 179/15 |
| 3,549,814 | 12/1970 | Jaeger et al. | 179/15 |
| 3,898,387 | 8/1975 | Fort | 370/80 |
| 4,053,712 | 10/1977 | Reindl | 179/15.55 T |
| 4,059,800 | 11/1977 | Jones, Jr. | 370/7 |
| 4,110,563 | 8/1978 | May et al. | 370/80 |
| 4,167,700 | 9/1979 | Coe et al. | 375/5 |
| 4,208,740 | 6/1980 | Yin et al. | 375/30 |
| 4,271,499 | 6/1981 | Leveque | 370/111 |
| 4,354,265 | 10/1982 | Nyberg et al. | 370/111 |

FOREIGN PATENT DOCUMENTS 0003009 7/1979 European Pat. Off.

OTHER PUBLICATIONS

ICC '71, Montreal, Canada, Jun. 14–16, 1971, "An Adaptive Pulse . . . ", by R. M. Wilkinson, pp. 1-1-1-1-15.
IEEE Trans. on Comm., vol. COM20(3), Jun. 1972, "Coherent Demodulation . . . ", by R. DeBuda, pp. 429–435.
BSTJ, vol. 52(7), Sep. 1973, "Adaptive Quantization . . . ", by P. Commiskey et al., pp. 1105–1119.
IEEE Trans. on Vehicular Technology, vol. VT-29(4), Nov. 1980, "Evaluation of Cellurlar . . . ", by R. J. Turner, pp. 353–360.
Conf. Rec. ICC'82, The Digital Revolution, vol. 3 of 3, Jun. 13–17, 1982, "A Digital Mobile . . . ", By S. Carney et al., pp. 5B.3.1–5B.3.6.
Globecom '82, IEEE Global Telecomm. Conf., vol. 1 of 3, Nov. 29–Dec. 2, 1982, "2400 BPS", by M. McLauglin, pp. A3.2.1–A3.2.5.
IEEE Global Telecomm. Conf., vol. 1 of 3, Nov. 29– Dec. 2, 1982, "32 Kbps . . . ", by D. W. Petr, pp. A8.3-.1–A8.3.5.
IEEE Global Telecomm. Conf., vol. 1 of 3, Nov. 29– Dec. 2, 1982, "Per-Channel . . . ", by R. Maruta et al., pp. A8.4.1–A8.4.5.

*Primary Examiner*—Robert L. Griffin
*Assistant Examiner*—Raymond C. Glenny
*Attorney, Agent, or Firm*—Erwin W. Pfeifle

[57] ABSTRACT

The present invention relates to a transmitter and a receiver for use in a digital communication system which are capable of transmitting and receiving, respectively, a single duplex analog signal channel, such as, for example, a voice channel, and limited short asynchronous data bursts. The transmitter portion includes an encoding means which uses an adaptive companding algorithm in the encoding process while the receiver portion includes a decoding means using the same synchronized algorithm in the decoding process. The transmitter and receiver at each end of a communication channel also include a signaling interface which can interrupt the coding and decoding process to transmit and receive, respectively, an occasional data burst without upsetting the synchronization of the adaptive companding algorithm states at both ends of the channel.

22 Claims, 2 Drawing Figures

1

TECHNIQUE FOR INSERTION OF DIGITAL DATA BURSTS INTO AN ADAPTIVELY ENCODED INFORMATION BIT STREAM

TECHNICAL FIELD

The present invention relates to a digital communication system particularly usable for speech and limited data burst transmissions and, more particularly, to a digital communication system which encodes an input analog signal into a representative digital pulse pattern in accordance with a predetermined adaptive companding algorithm and then modulates the encoded signal for transmission on a communication channel. The system also includes means for interrupting the encoding and decoding process at both ends of the communication channel to permit the transmission of a digital data burst when desired.

BACKGROUND OF THE INVENTION

Interest has been focused in recent years on digital transmission systems wherein both voice and data could be accommodated. For example, U.S. Pat. No. 3,549,814 issued to R. J. Jaeger, Jr. et al on Dec. 22, 1970 discloses a pulse code modulation (PCM) multiplexing system where all but one of the digit spaces in each of the 24 channels of the system are used to transmit voice frequency message signals and that digit is used to transmit its order of a digital word. In this manner, a 24 channel system can transmit 24 voice frequency signals and a 24 bit digital word. Another technique is disclosed in U.S. Pat. No. 4,053,712 issued to A. Reindl on Oct. 11, 1977 wherein an adaptive digital coder and decoder is described wherein the coder monitors the idle pattern code generated by the coder and introduces special code words into inter-syllable and inter-word pauses of normally encoded speech signals.

Various encoding techniques have been used to encode analog signals into digital signals for subsequent transmission. One such technique is with the use of an adaptive algorithm for expanding or contracting the encoding range as the analog signal amplitude expands or contracts, respectively. One such technique is the adaptive delta modulation which is a pulse modulation technique in which a continuous analog signal is adaptively converted into a digital pulse pattern for transmission through a channel which can be of low quality, as is well known in the art.

The problem remaining in the prior art is to provide a digital communication system which uses an adaptive algorithm for coding and decoding which can also accommodate short asynchronous data bursts without upsetting the adaptive algorithm states at both ends of the communication channel.

SUMMARY OF THE INVENTION

The foregoing problem in the prior art has been solved in accordance with the present invention which relates to a digital communication system particularly usable for speech and limited data burst transmissions and, more particularly, to a digital communication system which encodes an input analog signal into a representative digital pulse pattern in accordance with a predetermined adaptive companding algorithm and then modulates the encoded signal for transmission on a communication channel. The system also includes means for interrupting the encoding and decoding process at both ends of the communication channel to permit the transmission of a digital data burst when required.

It is an aspect of the present invention to provide a transceiver for use in a digital communication system where the transmitter portion includes (a) encoding means responsive to an input analog signal for encoding the analog signal into a representative digital pulse pattern in accordance with a predetermined adaptive companding algorithm, (b) means for modulating the resultant digital pulse pattern from the encoding means into an output signal for a transmission over a communication channel, (c) means for interrupting the encoding means to maintain the current algorithm state to permit the transmission of a digital data burst including a predetermined code word and data information, and (d) ending the interrupt of the coding means once the data burst has been transmitted. For purposes of security, the transmitter can also include a signal scrambling means.

It is a further aspect of the present invention to provide a transceiver for use in a digital communication signal where the receiver portion includes (a) demodulating means responsive to an encoded signal received over a communication channel for appropriately demodulating the received signal, (b) decoding means responsive to a digital pulse pattern from the demodulating means for decoding the digital pulse pattern into an output analog signal in accordance with a predetermined adaptive companding algorithm originally used in transmitting the encoded received signal, (c) means responsive to the detection of a predetermined code word indicating a data burst for interrupting the decoding means and maintaining its adaptive algorithm state while receiving the digital data burst, and (d) ending the interrupt of the decoding means once the data burst has been received. For purposes of security, the receiver can also include a signal descrambling means if the originally transmitted signal was scrambled.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
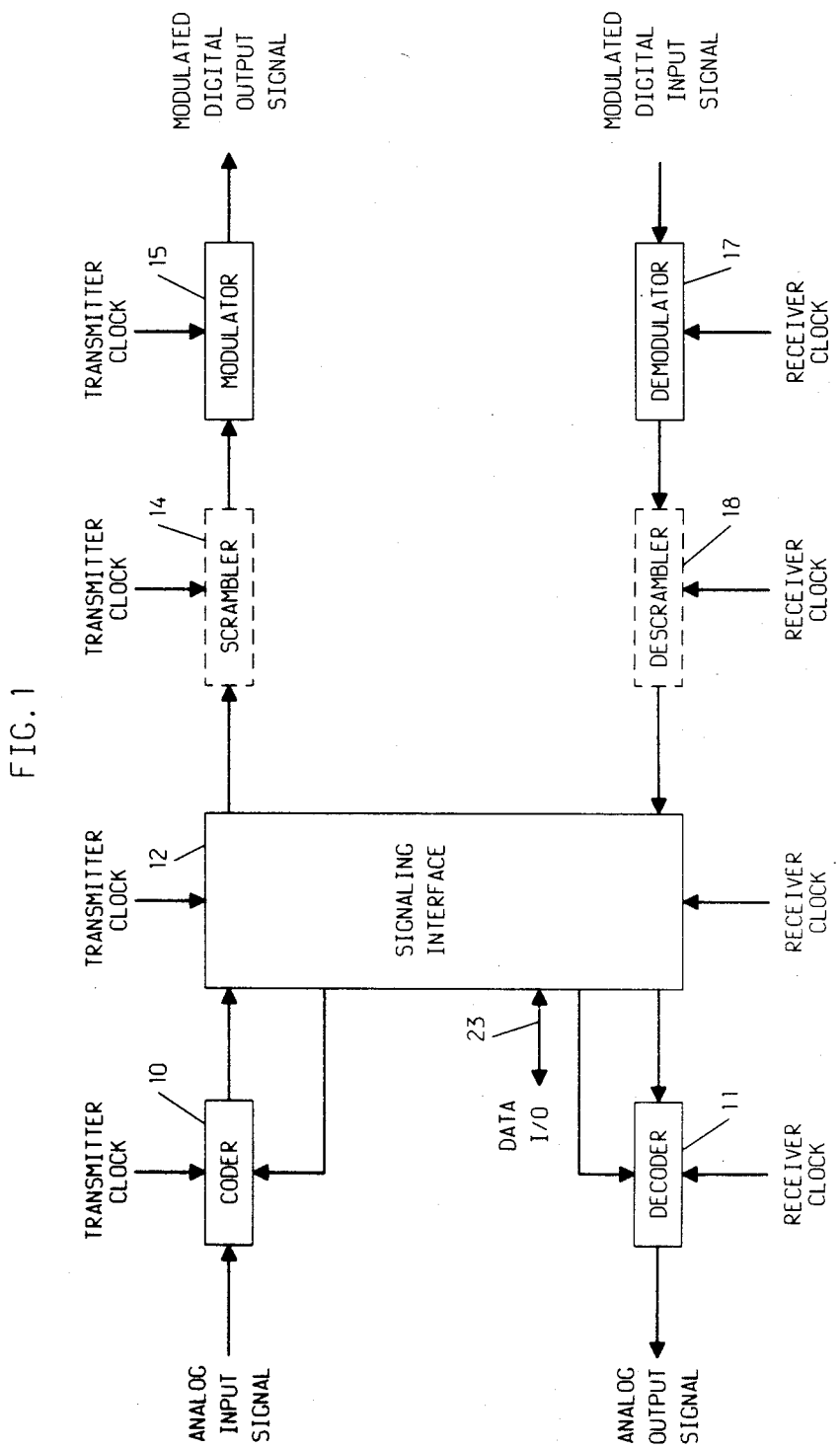
FIG. 1 is a block diagram of a typical digital communication transceiver for transmitting digitally encoded analog message signals and limited data bursts in accordance with the present invention.

FIG. 1 is a block diagram of an exemplary transceiver for transmitting and receiving digitally encoded analog message signals and, interspersed therewith, limited data burst transmissions. In the transmitter portion of the transceiver of FIG. 1, an analog input signal as, for example, a speech signal is inputted to a coder 10. Coder 10 functions to convert the analog input signal into a representative digital output signal in accordance with a predetermined adaptive companding algorithm. It is to be understood that any suitable coder can be used which functions as defined hereinabove. However, in the subsequent description it will be assumed that coder 10 is an adaptive delta modulation (ADM) speech coder with a bit rate of 32 kb/sec as such coder is simple, lacks the requirement of framing information, and is well known in the art. The transceiver also includes a decoder 11 which functions in the inverse manner of coder 10 to convert a digital input signal into an analog output signal in accordance with the same predetermined adaptive companding algorithm used by coder 10.

The coder 10 output signal is transmitted to a Signaling Interface 12. Signaling Interface 12 functions on the transmitting side to (a) receive a data word over a bus 23 from an input/output (I/O) data source (not shown), which can be, for example, a microprocessor in a telephone controlling keyboard, or some other data generating source, (b) upon reception of a data word, cause an interruption of coder 10 to maintain the state of the predetermined adaptive companding algorithm at its current state immediately prior to interruption, (c) transmit the data burst including a predetermined unique preamble which when detected at the remote receiver will cause that receiver's decoder 11 to be similarly interrupted and maintain its state of the predetermined adaptive companding algorithm in synchornization with the transmitter's coder 10, and (d) terminate the interrupt and enable coder 10 to continue its signal conversion process at the end of the data burst. At the remote transceiver, its Signaling Interface 12 functions to restore the decoding process at the end of the data burst as will be described herinafter for the receive side of Signalling Interface 12.

The digital output signals from coder 10 passing through Signaling Interface 12, and the data burst transmitted by Signaling Interface 12, can be processed by an optional scrambler 14, to provide security if desired, and then modulated by a modulator 15 prior to transmission to the remote transceiver. Optional scramber 14 can comprise any suitable scrambling device as, for example, a scrambler where the output is the modulo-2 sum of the speech or data and one or more delayed scrambler output bits. Such device is disclosed, for example, in the book "Transmission Systems For Communications", Fifth Edition, Bell Telephone Laboratories, Inc., 1982 at pages 749–751; and the article "A Universal Data Scrambler" *BSTF*, Vol. 52, No. 10, December 1973 at pages 1851–1866.

In the present exemplary transceiver, the 32 Kb/sec. output from coder 10 and Signaling Interface 12, and also optional scrambler 14 when present, is received by modulator 15. Modulator 15 can comprise, for example, a 4-level Frequency Shift Keying (FSK) modulator, and in such case would include means for converting the 32 Kb/sec. input signal into two parallal 16 Kb/sec. rate signals to assist in generating the 4-level FSK output signal. It is to be understood that modulator 15 can comprise any suitable modulator to provide the desired transceiver output signal. It is to be understood that the exemplary 32 Kb/sec. clock signals used by devices 10, 12, 14 and 15 are generated by a transmitter clock arrangement (not shown).

On the receive side of the transceiver shown in FIG. 1, the modulated digital input signal is received by a demodulator 17 which functions in the inverse manner of modulator 15 to generate, for example, the exemplary 32 Kb/sec. digital output signal. It is to be understood that if a 4-level FSK modulator is used at the transmitter, then a 4-level FSK demodulator would be used for demodulator 17. The output from demodulator 17 is transmitted to either an optional descrambler 18, which functions in the inverse of scrambler 14 when present to generate a descrambled signal which is usable by the receive portion of Signaling Interface 12 and decoder 11, or directly to the input of Signaling Interface 12. It is to be understood that the exemplary 32 Kb/sec. clock signals used by devices 11, 12, 17 and 18 are generated by a receiver clock arrangement which is synchronized to the receiver input signals.

Figure 2:
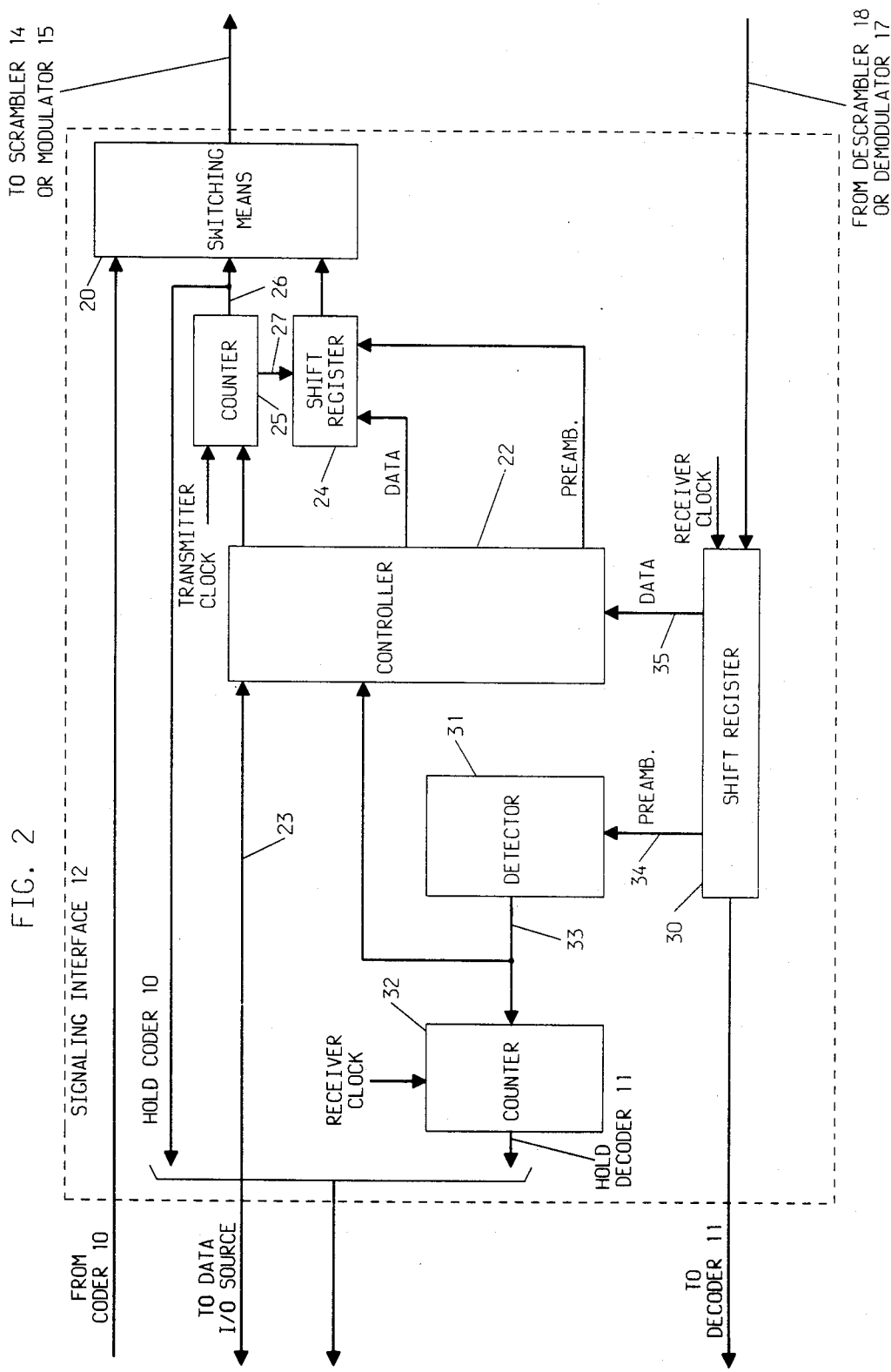
FIG. 2 is a block diagram of an exemplary signaling interface arrangement for use in the transceiver of FIG. 1 in accordance with the present invention.

A block diagram of Signaling Interface 12 is shown in FIG. 2. There, coded information from coder 10 is inputted to a switching means 20 which, when no data burst is to be transmitted, passes this coded information to scrambler 14, when present, or modulator 15. When a data source generates data which is to be transmitted to the remote transceiver, the data source inputs such data to controller 22 via bus 23. Controller 22 then inputs a unique preamble word into the head end of a shift register 24 and the data word to be transmitted following the preamble word at the tail end of shift register 24. For purposes of illustration, it will be assumed hereinafter that the unique preamble word will comprise 24 bits and that the data word comprises 16 bits to form an overall 40-bit data burst.

Once the data burst has been entered into shift register 24, controller 22 enables a counter 25 at an appropriate point in the information sequence from coder 10. Counter 25, when enabled, generates a control signal on lead 26 which (a) causes coder 10 to interrupt its coding process and maintain the predetermined adaptive companding coding algorithm at its present state just before the interrupt, and (b) causes switching means 20 to connect the input from shift register 24, rather than the input from coder 10, to its output to either scrambler 14 or modulator 15. Counter 25 then counts clock pulses from a transmitter clock source, not shown, and outputs such pulses over lead 27 to shift register 24 for reading the data burst, bit by bit, out of register 24 and through switching means 20 to scrambler 14, when present, or modulator 15. For a 40 bit data word, counter 25 would count 40 pulses from an exemplary 32 Kb/sec. transmitter clock source and at the end of the 40 pulses, when the data word has been read out of register 24, counter 25 would send a second control signal over lead 26 to (a) cause switching means 20 to connect the input from coder 10 to scrambler 14 or modulator 15, and (b) end the interrupt of coder 10.

On the receive side of Signaling Interface 12, a digital bit stream from demodulator 17 or descrambler 18, when present, enters a shift register 30 serially at the appropriate clock rate, e.g., 32 Kb/sec. The leading 24 bits stored in register 30 are read out in parallel via bus 34 and compared in detector 31 with the unique preamble word indicating a data burst. If the leading 24 bits in register 30 do not match the unique data burst preamble, then shift register 30 continues to output the bits serially to decoder 11. However, when the first 24 bits in register 30 are found to match the unique preamble word for a data burst, then detector 31 enables a counter 32 and controller 22 via lead 33. Controller 22, once enabled by detector 31, reads out the last 16 bits in parallel from shift register 30 via bus 35, which last 16 bits comprise the exemplary 16-bit data words, and sends the 16-bit data word to the appropriate data user(s) via bus 23. Concurrent therewith, counter 32 functions to (a) transmit a control signal to decoder 11 to interrupt the decoding process and maintain the predetermined adaptive companding decoding algorithm in its present state, (b) count 40 pulses corresponding to the time for the exemplary 40-bit data burst to pass through register 30, and (c) then send an enable control signal to decoder 11 to end the interrupt. In this manner the 40-bit data burst does not enter decoder 11 and get transmitted to an information end user not concerned with the data.

It is to be understood that the above-described embodiments are simply illustrative of the principles of the invention. Various other modifications and changes may be made by those skilled in the art which will embody the principles of the invention and fall within the spirit and scope thereof. For example, modulator 15 and demodulator 17 can comprise other than a 4-level FSK device. Additionally, during startup, the system wherein the transceiver is used may operate in the burst mode, where the demodulator adaptation is too slow to be effective. In this signaling mode, 2-level modulation and demodulation may be used to provide an adequate bit-error-rate (BER) even with imperfect adaptation.

What is claimed is:

1. A digital transceiver comprising:
    encoding means responsive to an analog input signal for encoding the analog input signal in accordance with a predetermined adaptive companding algorithm into a representative digital pulse pattern for transmission over a communication channel;
    decoding means responsive to a digital pulse pattern received from the communication channel for decoding said digital pulse pattern into an analog output signal in accordance with the predetermined adaptive companding algorithm used by the encoding means; and
    a signaling interface comprising interrupting means capable of (a) interrupting the coding means for a predetermined period of time and maintaining the predetermined adaptive companding algorithm used by the encoding means at the state found immediately prior to the interruption period during said interruption period to permit the transmission of a digital burst of data information over the communication channel during said interruption period, and (b) interrupting the decoding means for a predetermined period of time and maintaining the predetermined adaptive algorithm used in the decoding means at the state found immediately prior to the interruption thereof to permit the reception of a digital burst of data information during the interruption period, the interrupting means comprising;
    means for composing a digital burst of data information including a unique arrangement of symbols for identifying said burst as a digital burst of data information;
    switching means disposed for receiving the digital pulse pattern from the encoding means and for directing the digital pulse pattern from the encoding means to the communication channel in response to a first control signal and directing the output from the composing means to the communication channel in response to a second control signal; and
    control means responsive to a complete composition of a digital burst of data information in the composing means for generating (a) said second control signal for transmission to both the switching means for directing the output from the composing means to the communication channel, and the encoding means to initiate an interruption of the predetermined adaptive companding algorithm used therein, (b) third control signals to the composing means for directing the composed digital burst of data information to the switching means for transmission to the communication channel, and, after the digital burst of data information has been directed out of the composing means, (c) said first control signal to both the switching means for directing the digital pulse pattern from the encoding means to the communication channel, and the encoding means to terminate the interruption of the predetermined adaptive companding algorithm used therein.

2. A digital transceiver according to claim 1 wherein the interrupting means of the signaling interface further comprises:
    means for detecting the unique arrangement of symbols in the received digital pulse pattern from the channel identifying a digital burst of data information and for generating a control signal in response to such detection; and
    the control means is further responsive to the control signal from the detecting means for generating (a) a fourth control signal to the decoding means to initiate an interruption of the predetermined adaptive companding algorithm thereof, (b) fifth control signals for accessing the portion of the detected digital burst of data information comprising data symbols, and (c) a sixth control signal to the decoding means after the accessing of the data symbols to be received is complete to terminate said interruption of the predetermined adaptive companding algorithm of the decoding means.

3. A digital transceiver according to claim 2 wherein the encoding means is an adaptive delta modulation coder and the decoding means is an adaptive delta modulation decoder.

4. A digital transceiver according to claim 3 wherein the transceiver further comprises:
    means for modulating both the digital pulse pattern from the encoding means and a digital burst of data information in order to generate a representative output signal from the transceiver for transmission over the communication channel; and
    demodulating means responsive to a signal received from the communication channel for demodulating the received signal into a representative digital pulse pattern for transmission to the signaling interface and decoding means.

5. A digital transceiver according to claim 4 wherein the transceiver further comprises:
    means for encrypting both the digital pulse pattern from the encoding means and a digital burst of data information in accordance with a predetermined privacy code prior to the transmission thereof over the communication channel; and
    means for decrypting a digital pulse pattern received from the communication channel in accordance with the same predetermined privacy code as used by the encrypting means.

6. A digital transceiver according to claim 1 wherein the encoding means is an adaptive delta modulation coder and the decoding means is an adaptive delta modulation decoder.

7. A digital transceiver according to claim 6 wherein the transceiver further comprises:
    means for modulating the digital pulse pattern from the encoding means and a digital burst of data information in order to generate a representative output signal from the transceiver for transmission over the communication channel; and demodulating means responsive to a signal received from the communication channel for demodulating the received signal into a representative digital pulse pattern for transmission to the signaling interface and the decoding means.

8. A digital transceiver according to claim 1 wherein the transceiver further comprises:

means for modulating both the digital pulse pattern from the encoding means and a digital burst of data information in order to generate a representative output signal from the transceiver for transmission over the communication channel; and demodulating means responsive to a signal received from the channel for demodulating the received signal into a representative digital pulse pattern for transmission to the signaling interface and the decoding means.

9. A digital transceiver according to claim 1 wherein the transceiver further comprises:

means for encrypting both the digital pulse pattern from the encoding meas and a digital burst of data information in accordance with a predetermined privacy code prior to the transmission thereof over the communication channel; and means for decrypting a digital pulse pattern received from the communication channel in accordance with the same predetermined privacy code used by the encrypting means.

10. A digital transmitter comprising:

encoding means responsive to an analog input signal for encoding the analog input signal in accordance with a predetermined adaptive companding algorithm into a representative digital pulse pattern for transmission over a communication channel; and a signaling interface comprising interrupting means capable of interrupting the encoding means for a predetermined period of time and maintaining the predetermined adaptive companding algorithm used by the encoding means at the state found immediately prior to the interruption period to permit the transmission of a digital burst of data information over the communication channel during the interruption period, the interrupting means comprising means for composing a digital burst of data information including a unique arrangement of symbols for identifying said burst as a digital burst of data information;

switching means disposed for receiving the digital pulse pattern from the encoding means and for directing the digital pulse pattern from the encoding means to the communication channel in response to a first control signal and for directing the output from the composing means to the communication channel in response to a second control signal; and control means responsive to a complete composition of a digital burst of data information in the composing means for generating (a) said second control signal for transmission to both the switching means for directing the output from the composing means to the communication channel and the encoding means to initiate an interruption of the predetermined adaptive companding algorithm used by the encoding means, (b) third control signals to the composing means for directing the composed digital burst of data information to the switching means for transmission to the communication channel, and, after the digital burst of data information has been directed out of the composing means, (c) said first control signal to both the switching means for directing the digital pulse pattern from the encoding means to the communication channel, and the encoding means to terminate the interruption of the predetermined adaptive copanding algorithm thereof.

11. A digital transmitter according to claim 10 wherein the encoding means is an adaptive delta modulation coder.

12. A digital transmitter according to claim 11 wherein the transmitter further comprises:

means for modulating the digital pulse pattern from the encoding means and a digital burst of data information in order to generate a representative output signal from the transmitter for transmission over the communication channel.

13. A digital transmitter according to claim 12 wherein the transmitter further comprises:

means for encrypting both the digital pulse pattern from the encoding means and a digital burst of data information in accordance with a predetermined privacy code prior to the transmission thereof over the communication channel.

14. A digital transmitter according to claim 10 wherein the encoding means is an adaptive delta modulation coder.

15. A digital transmitter according to claim 10 wherein the transmitter further comprises:

means for modulating the digital pulse pattern from the encoding means and a digital burst of data information in order to generate a representative output signal from the transmitter for transmission over the communication channel.

16. A digital transmitter according to claim 10 wherein the transmitter further comprises:

means for encrypting both the digital pulse pattern from the encoding means and a digital burst of data information in accordance with a predetermined privacy code prior to the transmission thereof over a communication channel.

17. A digital receiver comprising:

decoding means responsive to a digital pulse pattern received from a communication channel for decoding said digital pulse pattern into an analog output signal in accordance with a predetermined adaptive companding algorithm originally used in encoding said received digital pulse pattern; and a signaling interface comprising:

means capable of detecting when a digital burst of data information is present in the received digital pulse pattern from the communication channel and detecting a unique arrangement of symbols within the received digital pulse pattern for identifying a digital burst of data information within said digital pulse pattern and generating a control signal in response to such detection, and means responsive to the detecting means detecting the presence of a digital burst of data information for interrupting the decoding means for a predetermined period of time and maintaining the predetermined adaptive companding algorithm used by the decoding means at the state found immediately prior to the interruption of the decoding means to permit the reception of a digital burst of data information, the interrupting means being responsive to the control signal form the detecting and generating means for generating (a) a first control signal to the decoding means to initiate an interruption of the predetemined adaptive companding algorithm used by the decoding means, (b) third control signals for accessing the portion of the detected digital burst of data information comprising data symbols to be received, and (c) a second control signal to the decoding means after the accessing of the data symbols to be received is complete to terminate said interruption of the predetermined adaptive companding algorithm of the decoding means.

18. A digital receiver according to claim 17 wherein the decoding means comprises an adaptive delta modulation decoder.

19. A digital receiver according to claim 18 wherein the receiver further comprises:
   demodulating means responsive to a signal received from the communication channel for demodulating the received signal into a representative digital pulse pattern for transmission to the signaling interface and decoding means.

20. A digital receiver according to claim 19 wherein the receiver further comprises:
   means for decrypting a digital pulse pattern received from the communication channel in accordance with a same predetermined privacy code which was used to originally encrypt the received digital pulse pattern.

21. A digital receiver according to claim 17 wherein the receiver further comprises:
   demodulating means responsive to a signal received from the communication channel for demodulating the received signal into a representative digital pulse pattern for transmission to the signaling interface and the decoding means.

22. A digital receiver according to claim 17 wherein the receiver further comprises:
   means for decrypting a digital pulse pattern received from the communication channel in accordance with a same predetermined privacy code which was used to originally encrypt the received digital pulse pattern.

* * * * *